(12) United States Patent
Bergqvist et al.

(10) Patent No.: US 12,131,570 B2
(45) Date of Patent: Oct. 29, 2024

(54) BIOMETRICS AUTHENTICATION DEVICE AND BIOMETRICS AUTHENTICATION METHOD FOR AUTHENTICATING A PERSON WITH REDUCED COMPUTATIONAL COMPLEXITY

(71) Applicant: QAMCOM INNOVATION LABS AB, Gothenburg (SE)

(72) Inventors: Johan Bergqvist, Zug (CH); Arnold Herp, Moehrendorf (DE)

(73) Assignee: Qamcom Innovation Labs AB, Gothenburg (SE)

( * ) Notice: Subject to any disclaimer, the term of this patent is extended or adjusted under 35 U.S.C. 154(b) by 397 days.

(21) Appl. No.: 17/602,418

(22) PCT Filed: Apr. 6, 2020

(86) PCT No.: PCT/EP2020/059714
§ 371 (c)(1),
(2) Date: Oct. 8, 2021

(87) PCT Pub. No.: WO2020/207945
PCT Pub. Date: Oct. 15, 2020

(65) Prior Publication Data
US 2022/0172505 A1    Jun. 2, 2022

(30) Foreign Application Priority Data
Apr. 10, 2019 (CH) .................. 00483/19

(51) Int. Cl.
*G06V 40/10* (2022.01)
*G06F 21/32* (2013.01)
*G06V 40/60* (2022.01)

(52) U.S. Cl.
CPC ............ *G06V 40/117* (2022.01); *G06F 21/32* (2013.01); *G06V 40/60* (2022.01)

(58) Field of Classification Search
CPC ...... G06V 40/117; G06V 40/60; G06V 40/12; G06V 40/1365; G06V 40/10; G06F 21/32; H04L 9/3231; H04L 63/0861
See application file for complete search history.

(56) References Cited

U.S. PATENT DOCUMENTS

| 11,410,458 | B2 | 8/2022 | Zhou |
| 2005/0286744 | A1 | 12/2005 | Yoshizu |

(Continued)

FOREIGN PATENT DOCUMENTS

| EP | 1 903 509 A1 | 3/2008 |
| EP | 2 506 188 A2 | 10/2012 |
| WO | 2015/127313 A1 | 8/2015 |

OTHER PUBLICATIONS

For U.S. Appl. No. 17/602,464: Office Action dated May 9, 2023 (39 pages) Response filed Sep. 12, 2023 (15 pages) Notice of Allowance dated Oct. 10, 2023 (27 pages).

(Continued)

*Primary Examiner* — Amandeep Saini
*Assistant Examiner* — Denise G Alfonso
(74) *Attorney, Agent, or Firm* — Fleit Intellectual Property Law; Paul D. Bianco; Stephen Bongini

(57) ABSTRACT

A biometrics authentication device for authenticating a person by comparing biometric features of a body part of the person with pre-stored biometric features of body parts of a plurality of registered persons is configured to: capture image data of the body part of the person; determine from the captured image data at least one characteristic geometric body part property of the body part of the person and biometric features of the body part of the person; limit comparison of the biometric features of the body part of the person to pre-stored biometric features of body parts of the plurality of registered persons which have a predefined (Continued)

similarity level with the at least one characteristic geometric body part property of the person.

20 Claims, 8 Drawing Sheets

(56) References Cited

U.S. PATENT DOCUMENTS

| | | | |
|---|---|---|---|
| 2006/0018523 | A1 | 1/2006 | Saitoh |
| 2006/0023919 | A1 | 2/2006 | Okamura |
| 2008/0226136 | A1* | 9/2008 | Takaku ............... G06V 40/107 |
| | | | 382/115 |
| 2012/0162403 | A1* | 6/2012 | Bae ...................... H04N 7/183 |
| | | | 348/E7.085 |
| 2012/0250954 | A1* | 10/2012 | Nada .................... G06V 40/70 |
| | | | 382/124 |
| 2014/0133710 | A1 | 5/2014 | Hama |
| 2014/0369558 | A1 | 12/2014 | Holz |
| 2016/0162020 | A1 | 6/2016 | Lehman |
| 2018/0165508 | A1* | 6/2018 | Othman ................ G06F 21/32 |
| 2022/0207922 | A1 | 6/2022 | Bergqvist |

OTHER PUBLICATIONS

Teledyne, Time of Flight—3D Imaging, May 29, 2018 (14 pages).
Office Action from the European Patent Office for Application No. 20 717 828.6, dated Jun. 30, 2023 (6 pages).
Svoboda, et al., Contactless biometric hand geometry recognition using a low-cost 3D camera, 2015 Intl Conf on Biometrics (12 pages).
Molina, et al., Real time user independent hand gesture recogniation from time-of-flight camera video using static and dynamic models, Machine Vision and Applications (2013) 24:187-204.
Samoil et al., Multispectral Hand Biometrics, 2014, Fifth International Conf. on Emerging Security Technologies (6 pages).
Chen and Zhang, Band Selection for Improvement of Dorsal Hand Recognition, 2011 (4 pages).
Rowe et al., Multispectral Whole-Hand Biometric Authentication System, 2007 Biometric Symposium, 2007 (abstract only).
International Preliminary Report on Patentability dated Sep. 28, 2021 and Written Opinion for PCT/EP2020/059718, filed Apr. 6, 2020 (English translation).
International Search Report dated May 4, 2020 for PCT/EP2020/059714, filed Apr. 6, 2020.
Written Opinion for PCT/EP2020/059714, filed Apr. 6, 2020.
Jane You, "On Hierarchical Palmprint Coding With Multiple Features for Personal Identification in Large Databases", vol. 14, Feb. 2004, 10 pages, IEEE.
International Preliminary Report on Patentability dated Sep. 28, 2021 and Written Opinion for PCT/EP2020/059714, filed Apr. 6, 2020 (English translation).
International Search Report (dated Jun. 12, 2020) and Written Opinion for PCT/EP2020/059718, filed Apr. 6, 2020.
Svoboda et al., "Contactless biometric hand geometry recognition using a low-cost 3D camera", 2015 International Conference on Biometrics (ICB), IEEE, May 19, 2015, pp. 452-457.
Samoil et al., "Multispectral Hand Biometrics", 2014 Fifth International Conference on Emerging Security Technologies, IEEE, Sep. 10, 2014, pp. 24-29.

* cited by examiner

BIOMETRICS AUTHENTICATION DEVICE AND BIOMETRICS AUTHENTICATION METHOD FOR AUTHENTICATING A PERSON WITH REDUCED COMPUTATIONAL COMPLEXITY

TECHNICAL FIELD

The present disclosure relates to a biometrics authentication device and a biometrics authentication method for authenticating a person. In particular, the present disclosure relates to a biometrics authentication device and a biometrics authentication method for authenticating a person with reduced computational complexity.

PRIOR ART

Biometric authentication devices are widely used for the authentication of persons, such as in the context of access control to resources as for example buildings, rooms, computers, smartphones, electronic bank accounts, voting systems, school or university exam papers, frontiers, company registers, etc.

In some embodiments, biometric authentication devices are configured to capture image data of a body part of a person, such as of a hand of the person, and to determine from the captured image data individual and typical biometric features. Captured image data of the hand or body part of the person may relate to image data captured with a near infrared light sensor (e.g. 700 nm to 900 nm), to image data captured with a visible light sensor (e.g. 400 nm to 600 nm), or a combination thereof. Biometric features determined from image data may relate to vein patterns, palm prints, lifelines, etc. of the hand. Image data captured in the near infrared light spectrum enable determining features relating to vein patterns of the hand. Image data captured in the visible light spectrum enable determining features relating to palm prints and lifelines of the hand.

Authentication of persons is based on pre-stored biometric features which were registered under control of an entitled and trustworthy authority. This authority verifies the identity of a person on the basis of an identification card such as passport, for example. Respective image data of the hand of the person is captured and biometric features of the hand or body part of the person are determined from the captured image data. The determined biometric features are stored in a database as pre-stored biometric features. In some embodiments, the pre-stored biometric features may include partially or fully the captured image data. The determined biometric features of the hand or body part, the captured image data of the hand, or a combination thereof, may relate to vein patterns, palm prints, lifelines, etc.

Later on, in case the authentication of a person is required, a biometric authentication device captures image data of the hand or body part of the person. Biometric features of the hand or body part of the person are determined and compared with pre-stored biometric features and/or pre-stored image data. Authentication is approved for the person if a match is found within the pre-stored biometric features, otherwise authentication is rejected.

As long as the pre-stored biometric features relate only to a few persons, such as less than a few tens of persons, the comparison of biometric features using a "brute force" method may provide a sufficiently fast response time of for example 1 second or less. In case the pre-stored biometric features relate to 1,000 persons or more, for example, computational complexity is strongly increased and the comparison of biometric features requires sufficiently high processing power in order to achieve response times of 1 second or less, for example. However, high processing power results in high power consumption, because sufficiently fast computers are required having parallel processing capabilities, for example. Accordingly, complex and expensive installations are required. For this reasons, wide deployment of the authentication of persons on the basis of the biometric features of a hand or a body part is currently limited.

In the prior art, it is known to accelerate the search of an object in a database by assigning to each object a unique key. For example, it is common practice that personal cards of persons, such as identity cards or credit cards, each have a unique key. A card reader which controls access to a particular resource, such as the entrance of a building or the account balance of a credit card, reads the key of the personal card of a particular person and grants access to the resource for the person if a match of the key in a pre-stored database can be found. Searching a unique key in a pre-stored database is precise and fast.

It is not possible to assign a unique key to biometric features of the hand or body part of a person because matching biometric features of the hand or body part of the person must be based on a similarity measure between the biometric features determined using a biometric authentication device and pre-stored biometric features. For example, the difference between two n-dimensional feature vectors must be determined and this difference must be compared with a sufficiently small threshold. Consequently, because biometric features of the hand or body part of a person cannot be assigned to a unique key, the techniques known in the prior art for searching a unique key in a pre-stored database cannot be used.

The document "On Hierarchical Palmprint Coding With Multiple Features for Personal Identification in Large Databases (You et al.), IEEE TRANSACTIONS ON CIRCUITS AND SYSTEMS FOR VIDEO TECHNOLOGY, VOL. 14, NO. 2, February 2004" proposes a hierarchical multifeature coding scheme to facilitate coarse-to-fine matching for efficient and effective palm-print verification in a large database. Global geometry-based key point distances (Level-1 feature), global texture energy (Level-2 feature), fuzzy "interest" line (Level-3 feature), and local directional texture energy (Level-4 feature) are defined.

SUMMARY OF THE INVENTION

One aspect of the invention relates to a biometrics authentication device and a biometrics authentication method which do not have at least some of the disadvantages of the prior art. In particular, one aspect relates to provide a biometrics authentication device and a biometrics authentication method with reduced computational complexity. In particular, one aspect of the invention relates to a biometrics authentication device and a biometrics authentication method which enable authentication of persons using current standard computing devices.

Various embodiments of the invention are set forth herein.

In one embodiment, a biometrics authentication device for authenticating a person compares biometric features of a body part of the person with pre-stored biometric features of body parts of a plurality of registered persons, wherein the biometrics authentication device is configured to: capture image data of the body part of the person; determine from the captured image data at least one characteristic geometric body part property of the body part of the person and biometric features of the body part of the person; limit comparison of the biometric features of the body part of the person to pre-stored biometric features of body parts of the plurality of registered persons which have a predefined similarity level with the at least one characteristic geometric body part property of the person. Because comparison of biometric features is limited to pre-stored biometric features having a predefined similarity level of the at least one characteristic geometric body part property, comparison is limited to a subset of pre-stored biometric features and computational complexity is therefore reduced.

In an embodiment, the biometrics authentication device is further configured to capture image data with at least a visible light sensor, a near infrared light sensor, a combined visible light and near infrared light sensor, and/or a time of flight camera. The visible light sensor, the near infrared light sensor, and/or the time of flight camera may be included in the biometrics authentication device. Biometric features may be determined using image data captured with the visible light sensor and/or image data captured with the near infrared light sensor. The at least one characteristic geometric body part property may be determined with image data captured with the time of flight camera. The time of flight camera enables determining the characteristic geometric body part property with high accuracy and pre-stored biometric features having the predefined similarity level of the at least one characteristic geometric body part property can be precisely determined, and computational complexity is therefore further reduced.

In an embodiment, the biometrics authentication device is configured to provide user guidance on the basis of image data captured with the time of flight camera.

In an embodiment, the user guidance relates to moving the body part into a predefined posture, in particular as regards one or more of a relative distance, a relative orientation, and a gesture of the body part. Relative distance and/or relative orientation may be defined with respect to a sensor or camera for capturing image data such as the visible light sensor, the near infrared light sensor and/or the time of flight camera. Together with optical characteristics such as horizontal and vertical field of view of a respective sensor or camera, in particular the time of flight camera, absolute metric values of the body part such as the length or width of fingers or the width of the palm can be determined. Accuracy of the determined characteristic geometric body part property is further improved and computational complexity is therefore further reduced.

In an embodiment, the body part relates to one or more of a palm side of a hand and a back side of a hand. Authentication may be based on vein patterns, palm prints and/or lifelines. Authentication is based on a body part having many advantages, such as ease of access, precise authentication, etc.

In an embodiment, the at least one characteristic geometric body part property relates to one or more of a sum of the lengths of a set of fingers of a hand, a sum of the average widths of a set of fingers of a hand and a width of a hand. It has been experimentally proven among men and women of different ages that using the sum of the lengths of a set of fingers of a hand or a sum of average widths of fingers of a hand and a width of a hand has advantageous properties, such as ease of determination, ease of access, for limiting comparison to pre-stored biometric features.

In an embodiment, the at least one characteristic geometric body part property relates to one or more of a left hand, a right hand, a palm side of a hand, and a back side of a hand. Also distinguishing between male and female hands may be provided. Comparison is further limited and computational complexity is further reduced.

In an embodiment, the similarity level relates to a subdivision of the at least one characteristic geometric body part property into a plurality of subsets. Only comparison of biometric features of a relevant subset or a few relevant subsets is required and computational complexity is further reduced.

In an embodiment, the subsets overlap to each other, in particular with a margin in accordance to an expected error of the at least one characteristic geometric body part property. False rejection of authentication can be avoided, while the increase in computational complexity remains restricted.

In another embodiment of the invention, a biometrics authentication method for authenticating a person compares biometric features of a body part of the person with pre-stored biometric features of body parts of a plurality of registered persons. The biometrics authentication method includes: capturing image data of the body part of the person; determining from the captured image data at least one characteristic geometric body part property of the body part of the person and biometric features of the body part of the person; limiting comparison of the biometric features of the body part of the person to pre-stored biometric features of body parts of the plurality of registered persons which have a predefined similarity level with the at least one characteristic geometric body part property of the person.

In an embodiment, the biometrics authentication method further includes: providing at least one of a visible light sensor, a near infrared light sensor, and a time of flight camera for capturing image data.

In an embodiment, the biometrics authentication method further includes: providing user guidance on the basis of image data captured with the time of flight camera.

In an embodiment, the at least one characteristic geometric body part property relates to one or more of a sum of the lengths of a set of fingers of a hand and a width of a hand.

In an embodiment, the similarity level relates to a subdivision of the at least one characteristic geometric body part property into a plurality of subsets.

In an embodiment, the subsets overlap to each other, in particular with a margin in accordance to an expected error of the at least one characteristic geometric body part property.

BRIEF EXPLANATION OF THE FIGURES

The invention is described in greater detail below with reference to embodiments that are illustrated in the figures. The figures show.

EMBODIMENTS OF THE INVENTION

Figure 1:
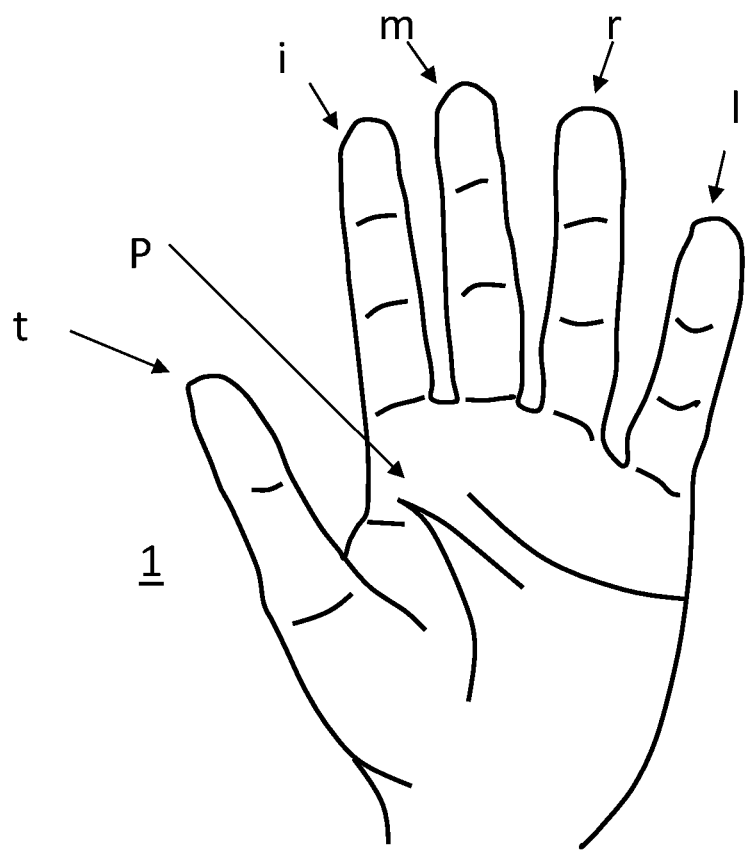
FIG. 1 illustrates schematically the palm side of the left hand of a first person.
Figure 2:
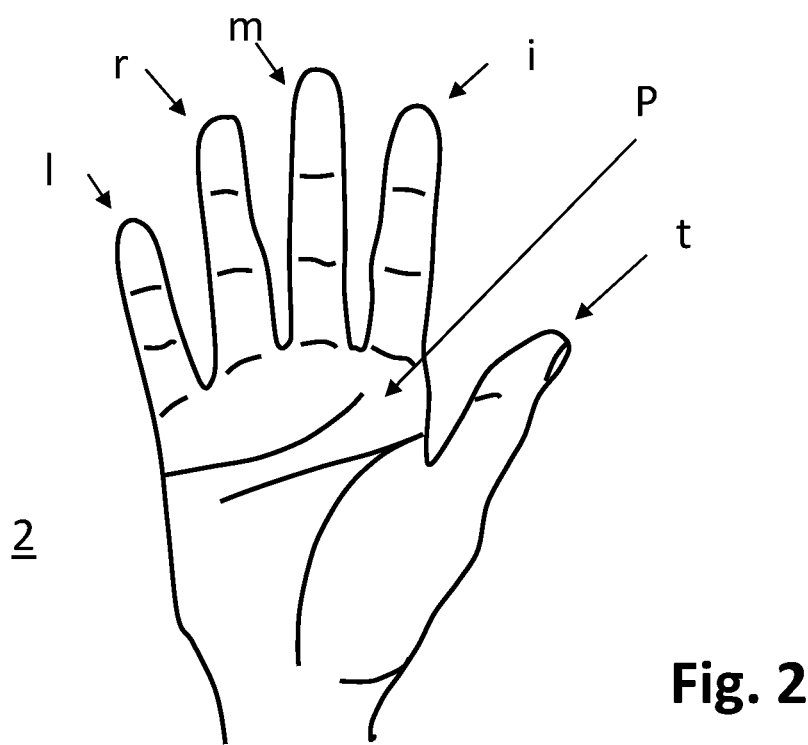
FIG. 2 illustrates schematically the palm side of the right hand of a second person.

FIG. 1 illustrates schematically the palm side of the left hand 1 of a first person. The left hand 1 has a thumb t, an index finger i, a middle finger m, a ring finger r, and a little finger l. FIG. 2 illustrates schematically the palm side of the right hand 2 of a second person. The right hand 2 has a thumb t, an index finger i, a middle finger m, a ring finger r, and a little finger l.

FIG. 1 and FIG. 2 illustrate schematically images of the palms of the left and the right hand 1, 2 captured with a visible light sensor (e.g. 400 nm to 600 nm). The hands 1, 2 have palm prints P or lifelines, which can be identified in visible light. Additionally or alternatively, vein patterns of the hands 1, 2 can be determined from image data captured in near infrared light (e.g. 700 nm to 900 nm). FIG. 1 and FIG. 2 do not illustrated vein patterns.

As is illustrated in FIG. 1 and FIG. 2, the palm prints P or lifelines of the hands 1, 2 of these two persons include individual biometric features, such as particular lengths, positions, curvatures, etc. By comparison with biometric features which have been pre-stored from body parts of registered persons, authentication of a particular person is enabled, in particular in combination with biometric features determined from respective vein patterns. Furthermore, authentication of a person may also be based on biometric features of the back side of the hand determined from image data captured in visible light, in near infrared light, or a combination thereof. However, it is presently not known if biometric features of the back side of the hand determined from image data captured with a visible light sensor sufficiently enable authentication of a person. In case of relying on the back side of a hand, it is presently believed that image data captured with a near infrared light sensor are necessary for sufficiently enabling authentication of a person.

Figure 3:
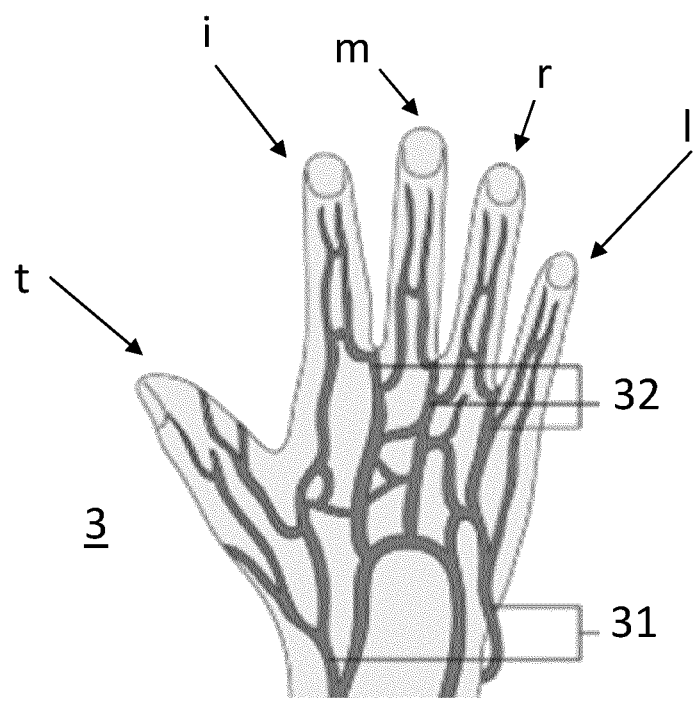
FIG. 3 illustrates schematically the venous network of the back side of the right hand of a third person.

FIG. 3 illustrates schematically the venous network of the back side of the right hand 3 of a third person. The right hand 3 has a thumb t, an index finger i, a middle finger m, a ring finger r, and a little finger l. As illustrated in FIG. 3, the back side of the hand 3 includes veins, which include the dorsal venous network 31 (rete venosum dorsale manus) and the dorsal metacarpal veins 32 (Vv. metacarpals dorsales). Vein patterns can be determined from image data captured with a near infrared light sensor, and individual biometric features can be determined form the image data captured in near infrared light.

Authentication of a person is based on pre-stored biometric features of the hands of registered users. For each registered person, a database includes biometric features determined from image data captured in visible light, in near infrared light, or a combination thereof. The image data include image data of the hand. The image data may include image data of the palm, of the back, or a combination thereof. The image data may include image data of the left hand, of the right hand, or a combination thereof. In order to authenticate a person, image data are captured from the hand of the person. The image data are captured in the visible light spectrum, in the near infrared light spectrum, or a combination thereof. The image data may be captured from the palm side of the hand, from the back side of the hand, or a combination thereof. The image data may be captured from the left hand, from the right hand, or a combination thereof.

Biometric features of the present person are determined from the captured image data and compared with pre-stored biometric features of the database. In case of a match, authentication is approved. Authentication is rejected otherwise. Comparing current biometric features of a person with pre-stored biometric features is computationally complex, especially in case the pre-stored biometric features relate to more than 1,000 persons, for example. However, for reasons of usability, response times of less than 1 second are required for authenticating a person. In the following, a technique for comparing biometric features is described which enables reducing the computational complexity by a factor of 10 to 13, for example, thereby enabling sufficiently fast response times using standard computers.

Figure 4:
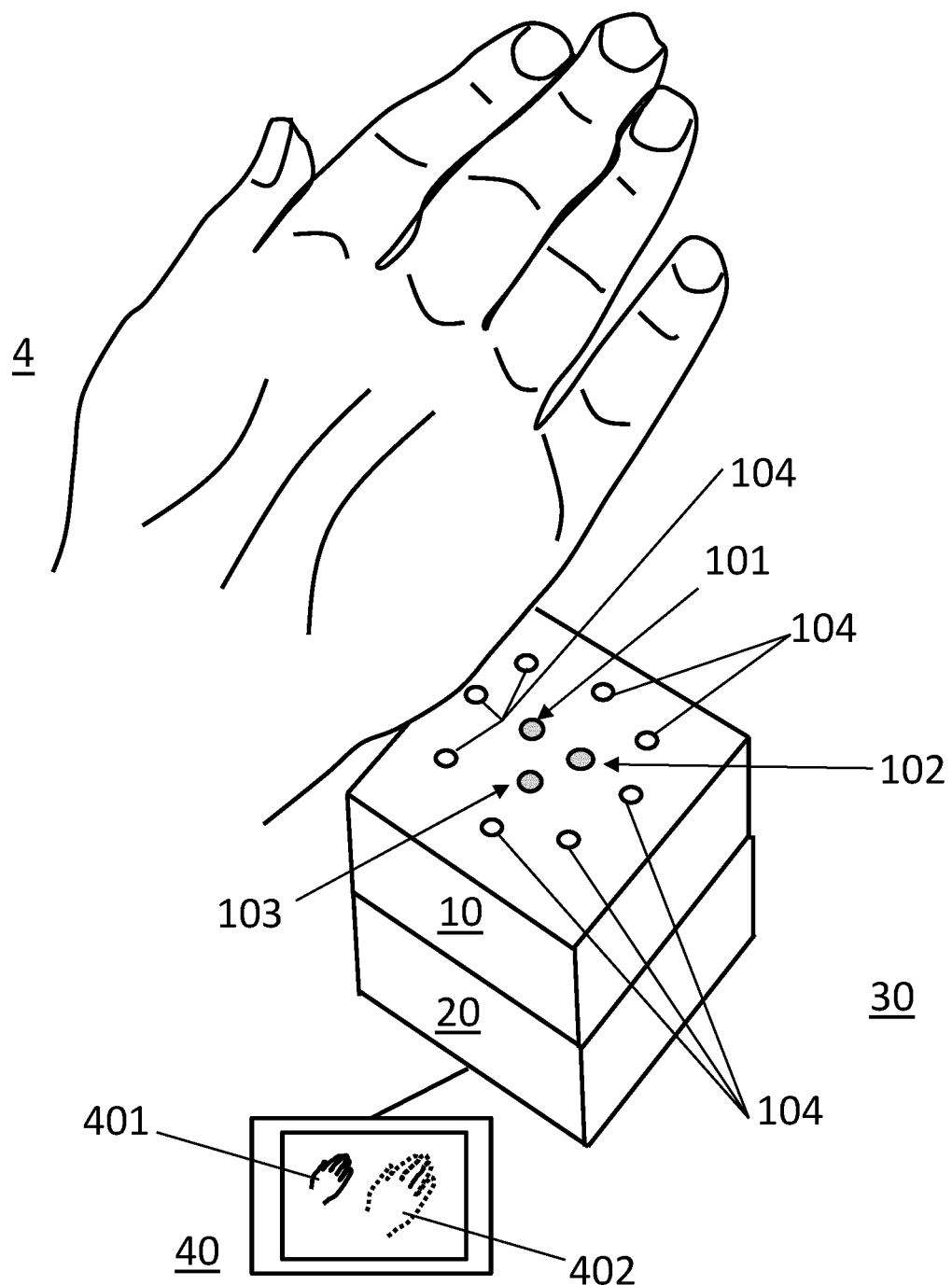
FIG. 4 illustrates schematically the hand of a person and a biometrics authentication device.

FIG. 4 illustrates schematically a biometrics authentication device 30. The biometrics authentication device 30 includes a biometric sensor 10 and a processing unit 20. The biometrics authentication device 30 may be connected to a user display 40, for example, for providing user guidance. The processing unit 20 may be attached to the biometric sensor 10 as illustrated in FIG. 4. The processing unit 20 may be located remotely within a computing infrastructure such as a host computer, server, cloud, etc. The processing unit 20 may include one or more processors and may have stored computer instructions which may be executed by the one or more processors in order to enable the functions as described in the present disclosure. The user display 40 may be fixedly installed close to the biometric sensor 10. The user display 40 may relate to a user device such as a notebook, smartphone, smartwatch, etc., wherein the processing unit 20 may communicate via a wireless connection such as Bluetooth with the user display 40, for example. The biometrics authentication device 30 may be included in a user device such as a notebook, smartphone, smartwatch, etc. As illustrated in FIG. 4, a current posture of the user's hand 401 and a desired posture of the user's hand 402 may be displayed on display 40.

The biometric sensor 10 enables capturing image data of the hand 4 of a person. The biometric sensor 10 includes a visible light sensor 101 for capturing image data in the visible light spectrum, a near infrared light sensor 102 for capturing image data in the near infrared light spectrum, and a time of flight camera 103 for capturing image data having three dimensions. One or more of the visible light sensor 101, the near infrared light sensor 102 and the time of flight camera 103 may be included into a single sensor. Furthermore, the biometric sensor 10 includes light sources 104. FIG. 4 illustrates eight light sources 104 arranged on a circle around the sensors 101, 102 and the time of flight camera 103. The light sources 104 may include a different number of light sources and/or may be arranged in a different manner. The light sources 104 may include one or more light sources providing illumination in the visible light spectrum and enabling capturing image data with the visible light sensor 101 in the visible light spectrum. The light sources 104 may include one or more light sources providing illumination in the near infrared light and enabling capturing image data with the near infrared light sensor 102 in the near infrared light. Calibration may be provided in particular as regards the geometric location of the visible light sensor 101, the near infrared light sensor 102 and the time of flight camera 103, such as the translational displacement between the visible light sensor 101, the near infrared light sensor 102 and the time of flight camera 103. Moreover, calibration may be provided as regards a scaling factor of image data captured by the time of flight camera 103, such as the absolute size of objects in the captured image data. Calibration may be provided within the biometric sensor 10, by post-processing in a dedicated computer such as the processing unit 20, or a combination thereof. Calibration may provide that the objects in the image data captured by the visible light sensor 101, the near infrared light sensor 102 and the time of flight camera 103 align to each other.

The visible light sensor 101 may include a visible light sensitive chip providing 2D image data (2D: two dimensional) in accordance to a visible light intensity distribution generated by a 3D scene (3D: three dimensional). The near infrared light sensor 102 may include a near infrared light sensitive chip providing 2D image data (2D: two dimensional) in accordance to a near infrared light intensity distribution generated by a 3D scene (3D: three dimensional). The visible light sensor 101 and the near infrared light sensor 102 may include lenses, buffers, controllers, processing electronics, etc. The visible light sensor 101 and the near infrared light sensor 102 may relate to commercially available sensors such as e2v semiconductors SAS EV76C570 CMOS image sensor, equipped with a blocking optical filter<500 nm wavelength for the visible light sensor 101 and with a blocking optical filter of >700 nm for the near infrared light sensor 102, or such as OmniVision OV4686 RGB-Ir sensor, with the visible light sensor 101 and the near infrared light sensor 102 combined in one chip and having included a RGB-Ir filter). The light sources 104 may include a visible light and/or near infrared light generator such as an LED (LED: light emitting diode). The light sources 104 may relate to commercially available light sources such as high power LEDs SMB1N series from Roithner Laser Technik GmbH, Vienna.

Figure 5:
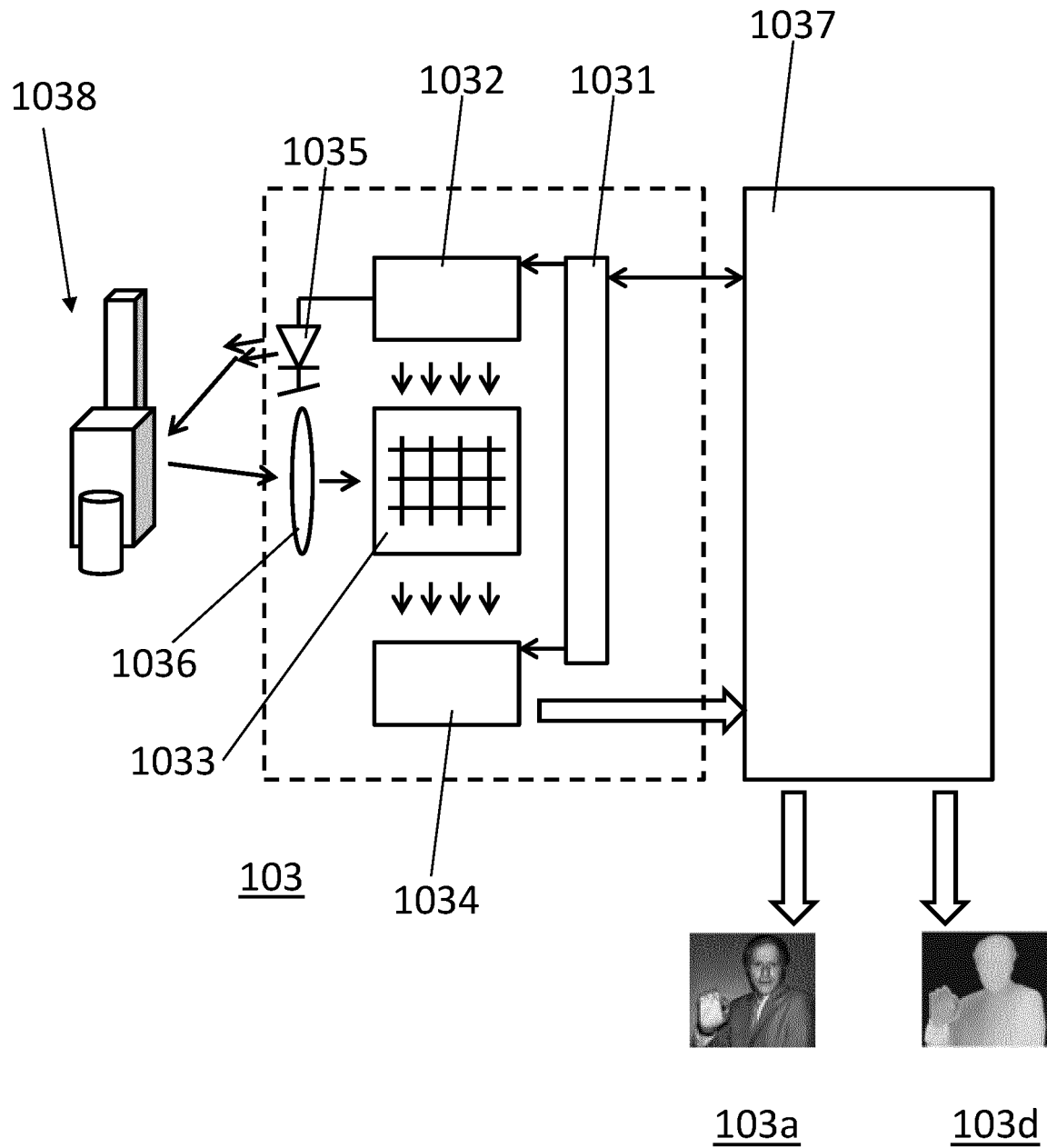
FIG. 5 illustrates schematically a time of flight camera.

FIG. 5 illustrates schematically a time of flight camera 103. The time of flight camera 103 includes a sequence controller 1031, a modulation controller 1032, a pixel matrix 1033, an A/D converter 1034 (A/D: analogue to digital), an LED or VCSEL 1035 (LED: light emitting diode; VCSEL: vertical-cavity surface-emitting laser), and a lens 1036. The sequence controller controls the modulation controller 1032 and the A/D converter 1034.

The modulation controller 1032 controls the LED or VCSEL 1035 and the pixel matrix 1033. The pixel matrix 1033 provides signals to the A/D converter 1034. The sequence controller 1031 interacts with a host controller 1037, for example via 120 bus (I2C: I-Squared-C serial data bus). The LED or VCSEL 1035 illuminates a 3D scene 1038. After a time of flight, the lens 1036 receives light reflected by the 3D scene 1038. The A/D converter 1034 provides raw 3D image data (3D: three dimensional) to the host controller 1037, for example via MIPI CSI-2 or PIF (MIPI: Mobile Industry Processor Interface; CSI: Camera Serial Interface; PIF: Parallel InterFace). The host controller performs a depth map calculation and provides an amplitude image 103a of the 3D scene 1038 and a depth image 103d of the 3D scene. As illustrated in FIG. 5, the background of the amplitude image 103a includes shades of light of a wall behind a person, for example, while the background of the depth image 103d has a single value, such as black, because the wall behind the person is arranged at a specific distance from the time of flight camera 103. The time of flight camera 103 may relate to a REAL3™ of the company Infineon™, and may include the specifications: direct measurement of depth and amplitude in every pixel; highest accuracy; lean computational load; active modulated infra-red light and patented Suppression of Background Illumination (SBI) circuitry in every pixel; full operation in any light condition: darkness and bright sunlight; monocular system architecture having no mechanical baseline; smallest size and high design flexibility; no limitation in close range operation; no special requirements on mechanical stability; no mechanical alignment and angle correction; no recalibration or risk of de-calibration due to drops, vibrations or thermal bending; easy and very fast once-in-a-lifetime calibration; cost efficient manufacturing.

As will be explained further below, the biometrics authentication device 30 as illustrated in FIG. 5 provides for authenticating a person by comparing biometric features of a hand 4 of the person with pre-stored biometric features of hands of a plurality of registered persons. The biometrics authentication device 30 is configured to capture image data of the hand 4 of the person, to determine from the captured image data at least one characteristic geometric hand property Sf, Wh of the hand 4 of the person and biometric features of the hand 4 of the person, and to limit comparison of the biometric features of the hand 4 of the person to pre-stored biometric features of hands of the plurality of registered persons which have a predefined similarity level with the at least one characteristic geometric hand property Sf, Wh of the person.

The biometrics authentication device may be configured to alternately capture image data in the visible light spectrum and image data in the near infrared light spectrum. The light sensors 104 may be configured to provide accordingly alternately illumination in the visible light spectrum and illumination in the near infrared light spectrum.

Figure 6:
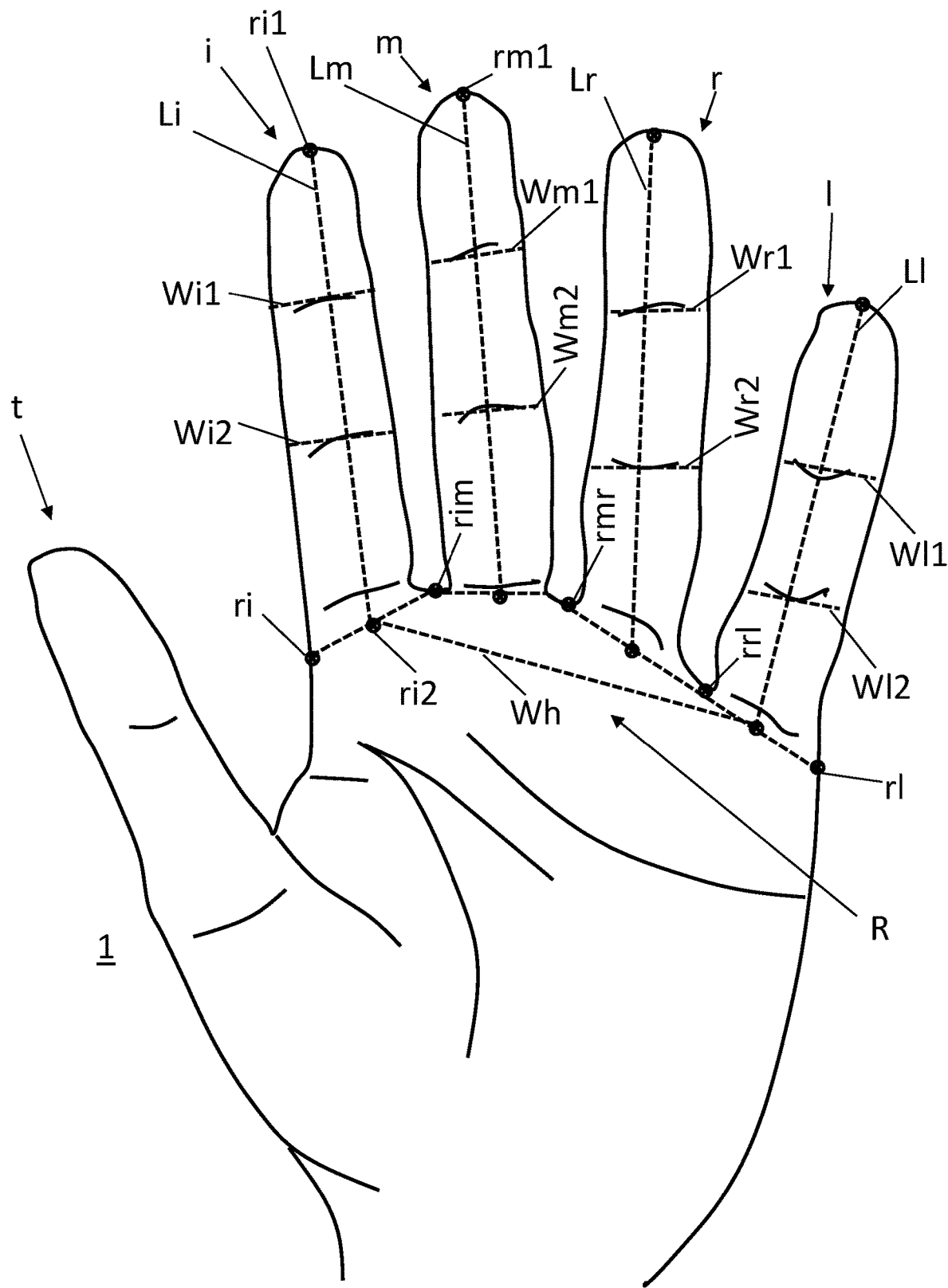
FIG. 6 illustrates schematically characteristic geometric hand properties of the hand of the first person.

FIG. 6 illustrates schematically characteristic geometric hand properties of the hand 1 of the first person, which may be determined on the basis of image data captured by the time of flight camera 103, for example. The image data captured by the time of flight camera 103 are calibrated and enable determining precisely a surveying and mapping of the hand 1 of the first person on the basis of a geometric raster R or net, which is illustrated in FIG. 6 with dashed lines. Using the raster R, the lengths Li, Lm, Lr, Ll of the fingers can be determined, the width Wh of the hand can be determined, the widths Wi1, Wi2, Wm1, Wm2, . . . of the phalanges can be determined, etc. Accordingly, the sum Sf=Li+Lm+Lr+Ll of the lengths of the four fingers index finger I, the middle finger m, the ring finger r, and the little finger l, as well as the width Wh of the hand 1 of the first person can be determined. Moreover, the sum Wf=(Wi1+Wi2)/2+(Wm1+Wm2)/2+ . . . of the average widths of the four fingers index finger I, middle finger m, ring finger r, and little finger l of the hand can be determined.

As indicated in FIG. 6, for each of the fingers I, m, r, l, the raster R or net includes reference points ri1, ri2, rm1, rm2, rr1, rr2, rl1, rl2 at the end and the root of each finger. Moreover, in direction from the root of the index finger i to the root of the little finger l, the raster R or net includes reference points ri, rim, rmr, rrl rl. In FIG. 6, the reference points ri1, ri2, rm1, . . . , ri, rim, rmr, . . . are marked with a strong black circle, but for easier legibility, not all reference points include the respective reference sign. Determining the reference points is based on image processing techniques such as using the OpenCV function "findContours" and others. In accordance to the reference points ri1, ri2, rm1, . . . , ri, rim, rmr, . . . , the raster R or net is clearly defined and respective lengths or widths of the fingers or hand can be clearly determined.

Figure 7:
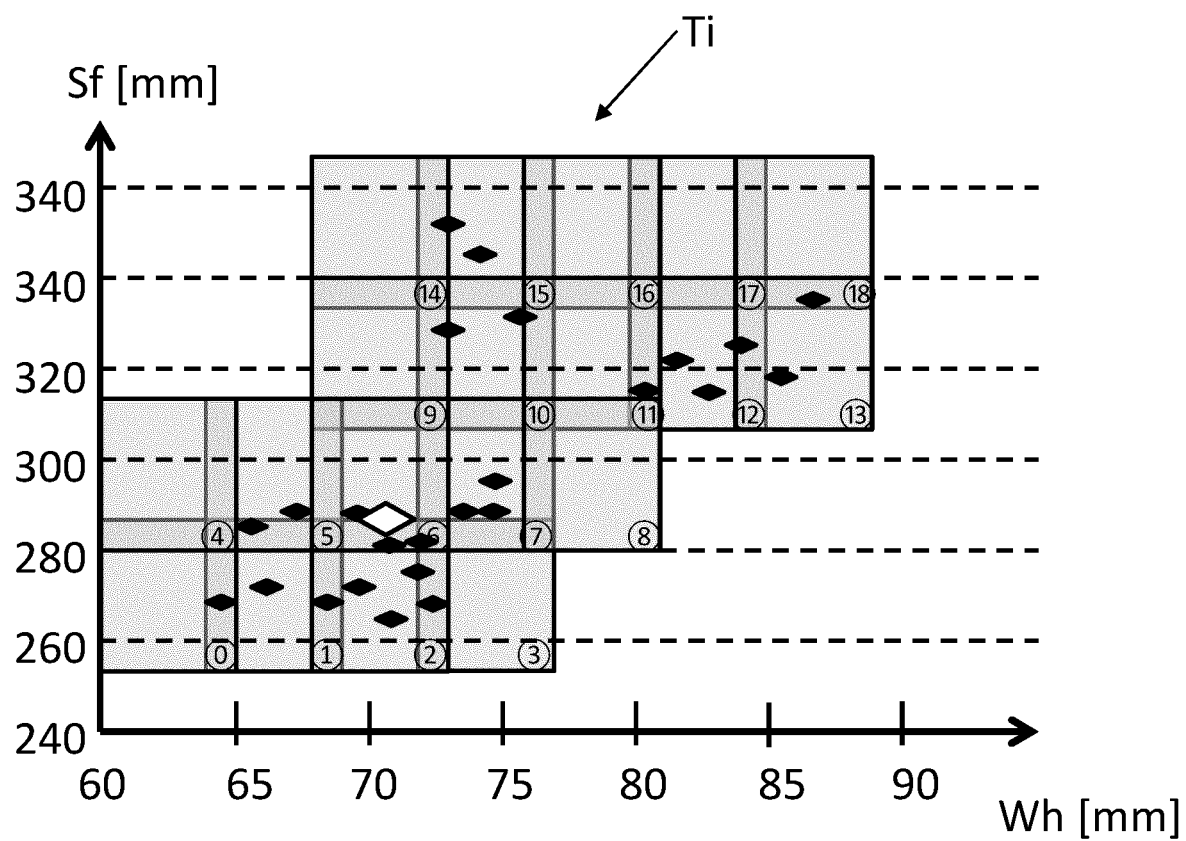
FIG. 7 illustrates schematically the subdivision of a space defined by characteristic hand part properties into subsets.

FIG. 7 illustrates schematically the subdivision of the space defined by the characteristic hand part properties hand with Wh and sum of the length of the four fingers Sf into subsets Ti. The hand with Wh is assigned to a first coordinate or abscissa of a Cartesian coordinate system. The sum of the length of the four fingers Sf is assigned to a second coordinate or ordinate of the Cartesian coordinate system. The unit of the abscissa and the ordinate are millimetres [mm]. Values of the width Wh and the sum Sf relating to pre-stored biometric features of registered persons are marked with small black rhombi. The Cartesian coordinate system is subdivided into overlapping subsets Ti, wherein each subset Ti has a rectangular shape. The overlapping parts of the subsets Ti are illustrated with a dark grey colour, while the non-overlapping parts of the subsets Ti are marked with a light grey colour. The overlapping region may be chosen in accordance to an expected measurement error for determining the width Wh and the sum Sf.

As indicated in FIG. 7, the characteristic hand part properties Wh, Sf define 2-dimensional intervals 0 . . . 18. In case not only two but n characteristic hand part properties are involved, n-dimensional intervals are defined. Each set of biometric features of a particular hand is assigned to the respective characteristic geometric properties, which includes at least one or maximal four intervals in case of the 2-dimensional intervals illustrated in FIG. 7. For known characteristic hand part properties, it is known for which intervals respective biometric features need to be compared. The size of the intervals and therefore the number of intervals depends on the reproducibility of the input values, namely the characteristic hand part properties. Instead of a "brute force" matching within such intervals, further optimizing can be achieved by sorting the candidates in accordance to their distance and by starting with the smallest distance, assuming that the characteristic hand part properties correlate with the biometric features.

The value of the width Wh and the sum Sf of a person for whom authentication is required is marked with a large white rhombus. Because of measurement errors, which make very difficult to authenticate a person on the basis of the width Wh and the sum Sf only, the large white rhombus does not coincide with one of the black rhombi relating to pre-stored biometric features of registered persons. Accordingly, authentication is required on the basis of a comparison of biometric features. However, in order to authenticate the person, it is sufficient to compare biometric features of the person with pre-stored biometric features of persons relating to the respective subset Ti only. Depending on the location of the white rhombus, comparison is limited to a single subset Ti, or to maximally four subsets Ti. In the example illustrated in FIG. 7, comparison is limited to the two subsets Ti which include the width Wh of 70 mm and the sum Sf of 260 mm and 300 mm. Thus, authenticating the person is limited to pre-stored biometric features of hands of the plurality of registered persons having a predefined similarity level with the at least one characteristic geometric hand property, namely the width Wh and the sum Sf. Accordingly, computational complexity for comparing biometric features is reduced, for example by a factor of 10 to 13, thereby enabling sufficiently fast response times using standard computers.

Beside the sum of the length of the four fingers Sf and the width of the hand Wh, a characteristic geometric hand property may relate to the sum Wf of the average widths of the four fingers of the hand. The characteristic geometric hand property may include one or more of the sum Sf, the width Wh, and the sum Wf. Thus, the subdivision as indicated in FIG. 7 may relate to a one dimensional space, to a two dimensional space or to a three dimensional space.

Beside the sum of the length of the four fingers Sf and the width of the hand Wh, a characteristic geometric hand property may related to the curvature of the hand and the location of the thumb. The curvature of the hand enables determining if the image data relate to the palm or to the back side of the hand. Additionally, the location of the thumb enables determining if the image data relates to the left hand or to the right hand. Accordingly, comparison of biometric features can be limited to respective pre-stored biometric features, for example to the pre-stored biometric features relating to the back side of the left hand, to the pre-stored biometric features relating to the palm side of the left hand, etc. Consequently, computational complexity for comparing biometric features is reduced.

Referring back to FIG. 4, the biometrics authentication device 30 may provide user guidance on the basis of image data captured with the time of flight camera 103. The user guidance may relate to moving the hand 4 into a predefined posture. The predefined posture may relate to a posture relative to the biometric sensor 10. As illustrated in FIG. 4, a current posture of the user's hand 401 and a desired posture of the user's hand 402 may be displayed on display 40. The size of the displayed current posture of the user's hand 401 may give guidance to the user as regards the desired relative distance from the biometric sensor 10. For example, in case the size of the displayed current posture of the user's hand 401 is smaller than the size of the displayed desired posture of the user's hand 402, the user is guided to move the hand 4 closer to the biometric sensor 10. Similar guidance may be provided as regards relative orientation of the hand 4. The relative orientation of the hand 4 may relate to an inclination of the palm or back side of the hand with respect to a plane defined by the biometric sensor 10. Similar guidance may be provided as regards a gesture of the hand. The gesture of the hand may relate to spread of fingers, to stretch of fingers, etc.

Figure 8:
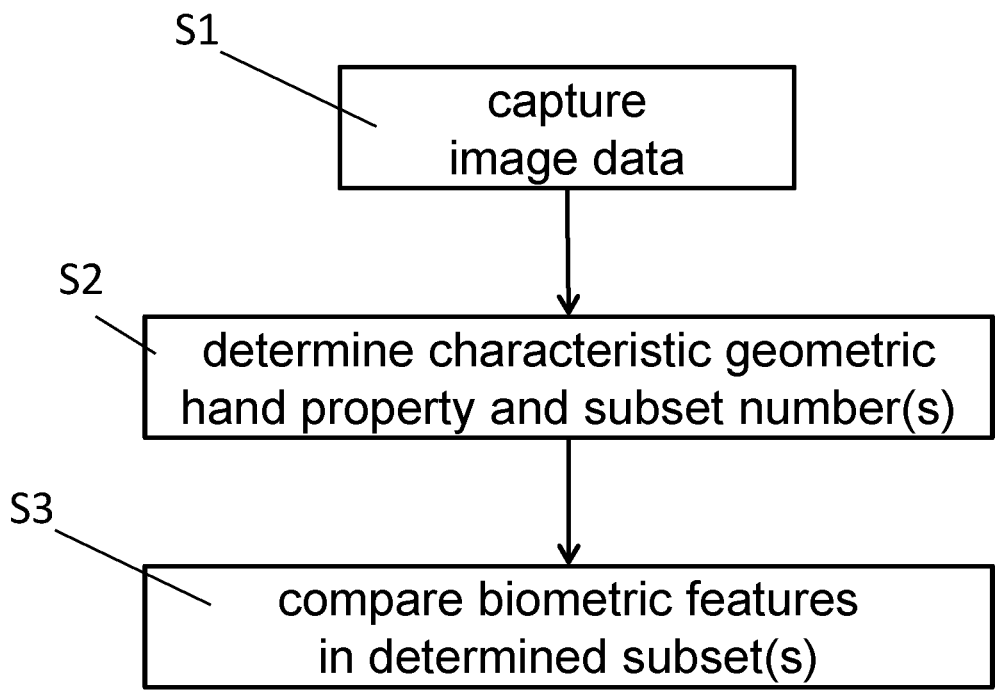
FIG. 8 illustrates schematically the steps of a biometrics authentication method using subsets of characteristic hand part properties.

FIG. 8 illustrates schematically the steps of a biometrics authentication method for authenticating a person by comparing biometric features of a hand 4 of the person with pre-stored biometric features of hand s of a plurality of registered persons. In step S1 captured are image data of the hand 4 of the person. In step S2 determined are from the captured image data at least one characteristic geometric hand property Sf, Wh of the hand 4 of the person and biometric features of the hand 4 of the person. In particular, determined are subset numbers in accordance to the intervals defined in connection with FIG. 7. In step S3 limited is comparison of the biometric features of the hand 4 of the person to pre-stored biometric features of hand s of the plurality of registered persons which have a predefined similarity level with the at least one characteristic geometric hand property Sf, Wh of the person, in particular in accordance to the determined subset(s).

Figure 9:
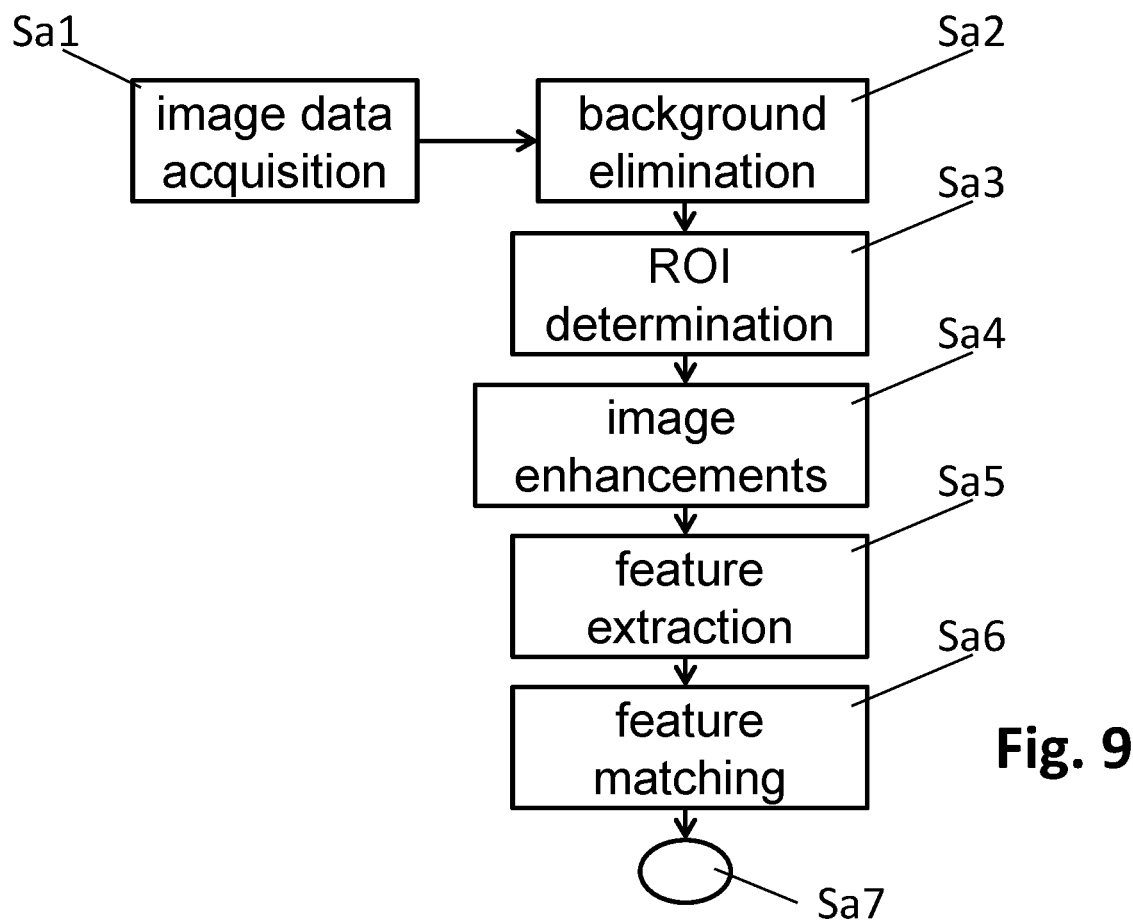
FIG. 9 illustrates schematically the steps of a biometrics authentication method.

FIG. 9 illustrates schematically building blocks of the algorithmic chain for authenticating a person. In step Sa1, image data are acquired with the visible light sensor 101 and the near infrared light sensor 102, wherein the visible light sensor 101, the near infrared light sensor 102, the time of flight camera 103 and the light sources 104 are controlled respectively. Image data may be stored in shared memory or a file system. In step Sa2, background is eliminated from image data acquired with the visible light sensor 101 and the near infrared light sensor 102. In step Sa3, a region of interest (ROI) is determined in the image data acquired with the visible light sensor 101 and the near infrared light sensor 102. In step Sa4, image enhancements or filters are applied to image data acquired with the visible light sensor 101 and the near infrared light sensor 102. Enhancements or filters may relate to unsharp masking, adaptive threshold, laplace, etc. in step Sa5, biometric features are extracted from to image data acquired with the visible light sensor 101 and the near infrared light sensor 102. Image feature extraction may relate to ORB (Oriented FAST and Rotated BRIEF), SIRF (Scale-Invariant Feature Transform), SURF (Speeded-Up Robust Features), etc. In step Sa6, biometric features are matched on the basis of biometric features extracted from image data acquired with the visible light sensor 101 and the near infrared light sensor 102. Biometric feature matching may involve BF (Brute Force), FLANN (Fast Approximate Nearest Neighbor Search), etc. In step Sa7, personal identification and terminal identification are verified and a YES/NO decision is provided accordingly Depending on the type of the feature descriptors, n-dimensional feature vectors are usually compared and matched using the Euclidean distance (or L2-norm), while binary coded features are compared and matched using the Hamming distance.

Figure 10:
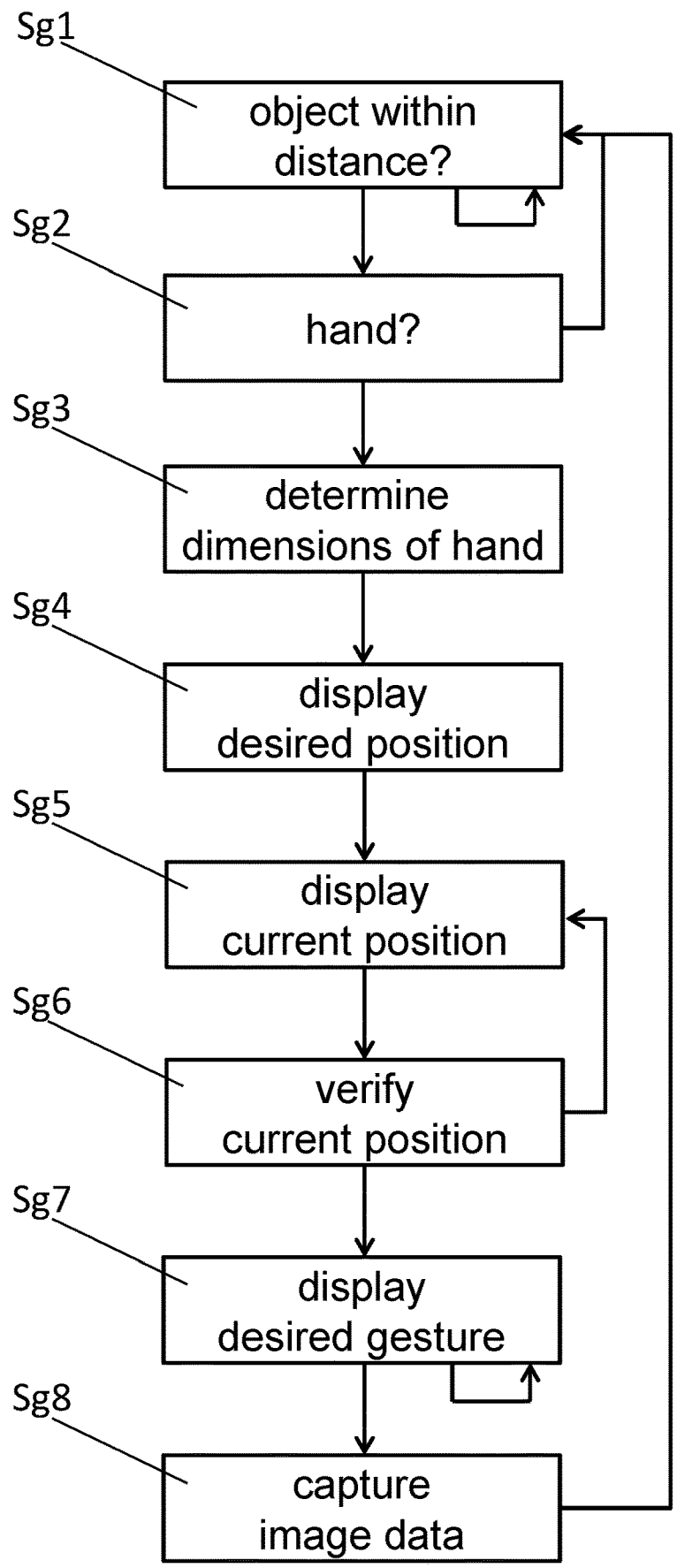
FIG. 10 illustrates schematically the steps involved for providing user guidance.

FIG. 10 illustrates schematically the steps involved for providing user guidance relating to guiding a person to bring the hand 4 into a desired posture with respect to the biometrics authentication device 30. In step Sg1, using the time of flight camera 103, it is verified if an object is within a distance of for example 40 cm. If not, after a predefined delay such as preferably 200 milliseconds, step Sg1 is repeated. In step Sg2, using the time of flight camera 103, it is verified if the object has the form of a hand. If not, after a predefined delay of for example between one second and five seconds, preferably three seconds, step Sg1 is repeated. In step Sg3, on the basis of image data captured with the time of flight camera 103, the absolute dimensions of the hand are determined. In step Sg4, a representation of the hand is displayed on a display 40 in a desired position which is optimal for the visible light sensor 101 and the near infrared light sensor 102, which position is at a predefined distance of for example about k cm, wherein k is within the depth of focus region of the visible light sensor 101 and/or the near infrared light sensor 102. The representation of the hand is displayed with only slightly spread fingers. In step Sg5, the current position of the hand is continuously determined using the time of flight camera 103 and a representation of the current position of the hand is continuously displayed on the display 40, in particular together with an overlay of a spirit level indicating rotation or inclination of the hand with respect to the desired position. In step Sg6, it is verified if the hand is at the desired position, in particular as regards the desired predefined distance apart from the visible light sensor 101 and the near infrared light sensor 102. If not, it is continued at step Sg5. Otherwise, in step Sg7, the representation of the hand at the desired position is changed into a hand with spread fingers, namely into a hand with a desired gesture, and the representation of the hand at the current position is continuously displayed on the basis of image data captured with the time of flight sensor 103. In step Sg8, if the hand is at the optimal distance (e.g. within ±3 cm), and if the hand is within an optimal rotational range (e.g. within ±12°) and within an optimal inclination range (e.g. within ±12°), image data is captured using the visible light sensor 101 and the near infrared light sensor 102 for authenticating the person, for example in accordance to the steps as specified in connection with FIG. 9. User guidance is then finished. If in step Sg8 image data cannot be captured, user guidance is interrupted after a predefined period of time such as preferably four seconds, wherein respective information is displayed on the display 40 such as that user guidance restarts at step Sg1.

REFERENCE SIGNS 1,2,3 hand of first, second and third person
t,i,m,r,l thumb finger, index finger, middle finger, ring finger, little finger
P palm print or lifelines
31, 32 dorsal venous network, dorsal metacarpal veins
4 hand of a person
10 biometric sensor
101 visible light sensor
102 near infrared light sensor
103 time of flight camera
104 light sources
20 processing unit
30 biometrics authentication device
40 display
401, 402 current posture of user's hand, desired posture of user's hand

The invention claimed is:

1. A biometrics authentication device for authenticating a person by comparing biometric features of a body part of the person with pre-stored biometric features of body parts of a plurality of registered persons, the biometrics authentication device comprising:
  a biometric sensor configured to capture image data of the body part of the person; and
  a processing unit configured to determine, from the captured image data:
    at least one characteristic geometric body part property of the body part of the person, the at least one characteristic geometric body part property comprising a width of a hand of the person, and
    the biometric features of the body part of the person,
  wherein the processing unit is further configured to approve or reject authentication of the person by:
    using a space defined by the at least one characteristic geometric body part property, the space being subdivided into a plurality of predefined subsets of values for the at least one characteristic geometric body part property, and
    comparing the biometric features of the body part of the person only to the pre-stored biometric features of the body parts of each of the registered persons whose at least one characteristic geometric body part property is in a same predefined subset of values as the at least one characteristic geometric body part property of the person.

2. The biometrics authentication device of claim 1, wherein the biometric sensor includes at least one of a visible light sensor, a near infrared light sensor, a combined visible light and near infrared light sensor, and a time of flight camera.

3. The biometrics authentication device of claim 1, wherein the biometric sensor includes a time of flight camera, and
  the processing unit is further configured to provide user guidance on the basis of image data captured with the time of flight camera.

4. The biometrics authentication device of claim 3, wherein the user guidance relates to moving the body part into a predefined posture as regards one or more of a relative distance, a relative orientation, and a gesture of the body part of the person.

5. The biometrics authentication device of claim 1, wherein the at least one characteristic geometric body part property further comprises one or more of a sum of the lengths of a set of fingers of a hand and a sum of the average widths of a set of fingers of a hand.

6. The biometrics authentication device of claim 1, wherein the at least one characteristic geometric body part property relates to one or more of a left hand, a right hand, a palm side of a hand, and a back side of a hand.

7. The biometrics authentication device of claim 1, wherein the predefined subsets of values overlap each other with a margin in accordance to an expected error of the at least one characteristic geometric body part property.

8. The biometrics authentication device of claim 1, wherein each of the predefined subsets of values includes a different interval of values for the at least one characteristic geometric body part property.

9. The biometrics authentication device of claim 1, wherein the processing unit is further configured to approve authentication of the person if the comparison finds a match based on a similarity measure between the biometric features of the body part of the person and the pre-stored biometric features of the body part of one of the registered persons.

10. The biometrics authentication device of claim 1,
wherein the at least one characteristic geometric body part property consists of the width of a hand of the person and a second characteristic geometric body part property of the person, so that the space defined by the at least one characteristic geometric body part property is a two-dimensional space, and
the two-dimensional space is subdivided into predefined subsets of values that each include a two-dimensional interval of values for the at least one characteristic geometric body part property.

11. The biometrics authentication device of claim 1,
wherein the at least one characteristic geometric body part property consists of the width of a hand of the person, a second characteristic geometric body part property of the person, and a third characteristic geometric body part property of the person, so that the space defined by the at least one characteristic geometric body part property is a three-dimensional space, and
the three-dimensional space is subdivided into predefined subsets of values that each include a three-dimensional interval of values for the at least one characteristic geometric body part property.

12. The biometrics authentication device of claim 1, wherein the processing unit is configured to compare the biometric features of the body part of the person only to the pre-stored biometric features of the body parts of the registered persons in one and only one of the predefined subsets of values.

13. A biometrics authentication method for authenticating a person by comparing biometric features of a body part of the person with pre-stored biometric features of body parts of a plurality of registered persons, the biometrics authentication method including:
using a biometric sensor to capture image data of the body part of the person;
determining, by a processing unit from the captured image data, at least one characteristic geometric body part property of the body part of the person, and the biometric features of the body part of the person, the at least one characteristic geometric body part property comprising a width of a hand of the person; and
approving or rejecting authentication of the person by the processing unit:
using a space defined by the at least one characteristic geometric body part property, the space being subdivided into a plurality of predefined subsets of values for the at least one characteristic geometric body part property, and
comparing the biometric features of the body part of the person only to the pre-stored biometric features of the body parts of each of the registered persons whose at least one characteristic geometric body part property is in a same predefined subset of values as the at least one characteristic geometric body part property of the person.

14. The biometrics authentication method of claim 13, wherein the biometric sensor includes at least one of a visible light sensor, a near infrared light sensor, and a time of flight camera for capturing the image data.

15. The biometrics authentication method of claim 13,
wherein the biometric sensor includes a time of flight camera, and
the method further includes providing, by the processing unit, user guidance on the basis of image data captured with the time of flight camera.

16. The biometrics authentication method of claim 13, wherein the at least one characteristic geometric body part property further comprises one or more of a sum of the lengths of a set of fingers of a hand and a sum of the average widths of a set of fingers of a hand.

17. The biometrics authentication method of claim 13, wherein the predefined subsets of values overlap each other with a margin in accordance to an expected error of the at least one characteristic geometric body part property.

18. A biometrics authentication device for authenticating a person based on a plurality of registered persons, the biometrics authentication device comprising:
a biometric sensor configured to capture image data of a hand of a person; and
a processing unit configured to determine, from the captured image data:
n hand properties of the person, the n hand properties including a width of the hand of the person, and
biometric features of the hand of the person,
wherein an n-dimensional space defined by the n hand properties is subdivided into a plurality of predefined subsets of values for the n hand properties, and
the processing unit is further configured to approve or reject authentication of the person by:
comparing the biometric features of the hand of the person only to pre-stored biometric features of a hand of each of the registered persons whose n hand properties are in a same predefined subset of values as the n hand properties of the person, and
approving authentication of the person if the comparison finds a match based on a similarity measure between the biometric features of the hand of the person and the pre-stored biometric features of the hand of one of the registered persons.

19. The biometrics authentication device of claim 18,
wherein n=2 so that the space is a two-dimensional space, and
the two-dimensional space is subdivided into predefined subsets of values that each include a different two-dimensional interval of values for the hand properties.

20. The biometrics authentication device of claim 18, wherein each of the predefined subsets of values overlaps at least one other of the predefined subsets of values.

\* \* \* \* \*